United States Patent
Brown et al.

(10) Patent No.: US 9,544,148 B2
(45) Date of Patent: Jan. 10, 2017

(54) METHOD OF SENDING A SELF-SIGNED CERTIFICATE FROM A COMMUNICATION DEVICE

(71) Applicant: Research In Motion Limited, Waterloo (CA)

(72) Inventors: Michael Stephen Brown, Kitchener (CA); David Francis Tapuska, Waterloo (CA)

(73) Assignee: BlackBerry Limited, Waterloo (CA)

( * ) Notice: Subject to any disclaimer, the term of this patent is extended or adjusted under 35 U.S.C. 154(b) by 39 days.

(21) Appl. No.: 13/623,178

(22) Filed: Sep. 20, 2012

(65) Prior Publication Data

US 2013/0145165 A1 Jun. 6, 2013

Related U.S. Application Data

(60) Provisional application No. 61/566,154, filed on Dec. 2, 2011.

(51) Int. Cl.

| H04L 9/32 | (2006.01) |
|---|---|
| H04L 29/06 | (2006.01) |
| H04M 1/725 | (2006.01) |
| H04W 4/00 | (2009.01) |
| G06F 17/30 | (2006.01) |

(52) U.S. Cl.
CPC ......... *H04L 9/3247* (2013.01); *H04L 63/0492* (2013.01); *H04L 63/0823* (2013.01); *H04L 63/18* (2013.01); *H04M 1/7253* (2013.01); *H04W 4/008* (2013.01)

(58) Field of Classification Search
CPC ..... H04L 9/3247; H04L 63/0492; H04L 63/18

USPC .......... 713/176, 168–174, 182–186, 202; 709/206, 225, 229, 249, 389; 726/2–8
See application file for complete search history.

(56) References Cited

U.S. PATENT DOCUMENTS

| 2004/0268142 A1* | 12/2004 | Karjala et al. ............... 713/200 |
| 2006/0112419 A1 | 5/2006 | Brown et al. |
| 2006/0242405 A1* | 10/2006 | Gupta ................ H04L 63/0823 713/156 |

(Continued)

FOREIGN PATENT DOCUMENTS

| WO | 01/31836 | 5/2001 |
| WO | 01/58081 | 8/2001 |

OTHER PUBLICATIONS

How to Retrieve the Tumbprint of a Certificate; 2011 Microsoft; http://msdn.microsoft.com/en-us/library/ms734695 (d=printer).aspx.

(Continued)

*Primary Examiner* — Evans Desrosiers
(74) *Attorney, Agent, or Firm* — Ridout & Maybee LLP

(57) ABSTRACT

A method of sending a self-signed certificate from a communication device, the self-signed certificate being signed by the communication device. The method includes: receiving a communication in relation to establishing a session from a second communication device in proximity to said communication device, outputting on an output device of said communication device a certificate hash of the self-signed certificate or an address of where to obtain the certificate hash, and sending the self-signed certificate to said second communication device. The method may also include sending a broadcast message to announce a presence of the communication device.

16 Claims, 5 Drawing Sheets

(56) References Cited

U.S. PATENT DOCUMENTS

| | | | |
|---|---|---|---|
| 2007/0055877 A1* | 3/2007 | Persson | H04L 63/0272 713/171 |
| 2007/0136800 A1 | 6/2007 | Chan et al. | |
| 2008/0195862 A1* | 8/2008 | Bender | H04L 12/58 713/156 |
| 2009/0132813 A1 | 5/2009 | Schibuk | |
| 2009/0198618 A1 | 8/2009 | Chan et al. | |
| 2009/0288138 A1 | 11/2009 | Kalofonos | |
| 2011/0099381 A1 | 4/2011 | Brown et al. | |
| 2011/0307646 A1* | 12/2011 | Lee | G11C 11/5628 711/103 |

OTHER PUBLICATIONS

How to Install the Root Certificate—ECE Information Technology Services; http://help.ece.ubc.ca/How_To_Install_The_Root_Certificate.

Secure Logins; https://bto.bluecoat.com/packetguide/8.3/info/secure-logins.htm.

ITU-T; International Telecommunications Union; Telecommunication Standardization Sector of ITU; X.509; Series X: Data Networks, Open System Communications and Security Directory.

ActiveX Reuse Browser Client Certificate; http://stackoverflow.com/questions/6292176/activex-reuse-browser-client-certificate.

Certificate Trust Model; MXC Software; http://www.mxcsoft.com/Cryp_Trust%20Model.htm.

How to Validate a Certificate Chain; D.I. Management Services Pty Limited; 2004; http://www.cryptosys.net/pki/x509_validatechain.html.

Extended European Search Report dated Feb. 13, 2013 for corresponding European Patent Application No. 12185242.0.

International Search Report and Written Opinion dated Mar. 18, 2013 for corresponding PCT Application No. PCT/CA2012/050866.

Secure and Usable Out-Of-Band Channels for Ad Hoc Mobile Device Interactions; Ronald Kainda, Ivan Flechais, and A.W. Roscoe; Oxford University Computing Laboratory, Wolfson Building, OX1 3QD Oxford.

\* cited by examiner

METHOD OF SENDING A SELF-SIGNED CERTIFICATE FROM A COMMUNICATION DEVICE

CROSS-REFERENCE TO RELATED APPLICATIONS

This application claims the benefit of U.S. patent application No. 61/566,154 filed Dec. 2, 2011, the contents of which are hereby incorporated by reference.

TECHNICAL FIELD

Example embodiments relate to the field of security and authentication, and more specifically to the field of key certificates.

BACKGROUND

In a chain of trust scheme, certificates are often trusted based on the validity of "higher ranking" certificates. At the highest level of certificates, there is typically a root certificate or self-signed certificate which provides the ultimate in attestation authority in the chain of trust scheme.

In some existing conventional systems, root certificates are generally pre-installed in an operating system, pushed through operating system auto-updates or through corporate policy controls. The end-user typically is not involved in installing root certificates on their computer. Such systems may not permit the user to readily transfer root certificates to create new or temporary secure relationships.

Additional difficulties with existing systems may be appreciated in view of the detailed description below.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

Example embodiments generally relate to creating a trust relationship between communication devices by communicating a self-signed certificate.

In accordance with an example embodiment, there is provided a method of sending a self-signed certificate from a communication device, the self-signed certificate being signed by the communication device. The method includes: receiving a communication in relation to establishing a session from a second communication device in proximity to said communication device, outputting on an output device of said communication device a certificate hash of the self-signed certificate or an address of where to obtain the certificate hash, and sending the self-signed certificate to said second communication device. The method may also include sending a broadcast message to announce a presence of the communication device.

In accordance with another example embodiment, there is provided a communication device, comprising, a processor; memory for storing a self-signed certificate, the self-signed certificate being signed by the communication device, an output device, and a communication subsystem for sending and receiving communications with a second communication device in proximity to said communication device. The processor is configured for: receiving a communication in relation to establishing a session, outputting on the output device a certificate hash of the self-signed certificate or an address of where to obtain the certificate hash, and sending the self-signed certificate to said second communication device.

In accordance with yet another aspect, there is provided a non-transitory computer readable medium having instructions stored thereon executable by a processor for sending a self-signed root certificate from a communication device, the self-signed certificate being signed by the communication device, the instructions comprising instructions for performing the method.

In some example embodiments, the sending of the self-signed certificate is performed over a short-range or direct communication channel. In some example embodiments, the communication device and the second communication device establish a secured session based on the self-signed certificate over a network-based channel using a same communication protocol as the short-range or direct communication channel. In some example embodiments, the short-range or direct communication channel is established by implementing protocols from Long Term Evolution (LTE) protocol.

Figure 1:
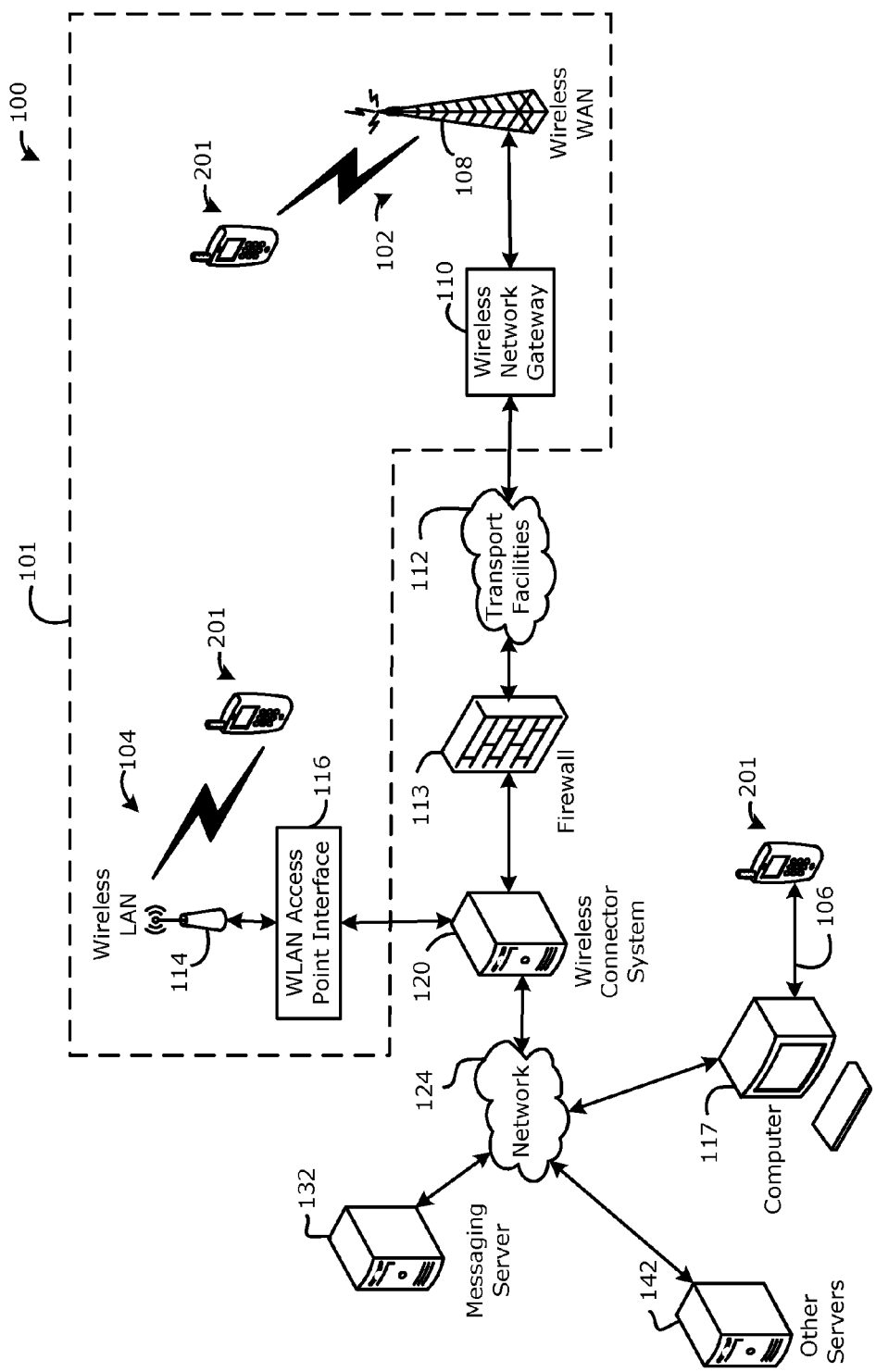
FIG. 1 illustrates a block diagram of a communications system to which embodiments may be applied.

Reference is first made to FIG. 1 which shows in block diagram form a communication system 100 in which example embodiments can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA/HSUPA (High-Speed Downlink Packet Access/High-Speed Uplink Packet Access), Long Term Evolution (LTE) by 3rd Generation Partnership Project (3GPP), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) and optionally other servers 142. The other servers 142 may comprise a content server for providing content such as internet content or content from an organization's internal servers to the mobile communication devices 201 in the wireless network 101, an application server for implementing server-based applications such as instant messaging (IM) applications, or a web server for providing content accessible by a web browser.

For the purposes of the described example embodiments, any server within an enterprise network, such as a messaging server or any other server, will be referred to as an enterprise server. A service may include one or more servers or enterprise servers.

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 110 is adapted to send data packets received from the mobile device 201 over the WWAN 102 to the wireless connector system 120. The wireless connector system 120 then sends the data packets to the appropriate connection point such as the messaging server 132, or other servers 142. Conversely, the wireless connector system 120 sends data packets received, for example, from the messaging server 132, or other servers 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, or other servers 142.

The network 124 may comprise a private local area network, metropolitan area network, wide area network, the public internet or combinations thereof and may include virtual networks constructed using any of these, alone, or in combination.

A mobile device 201 may alternatively connect to the wireless connector system 120 using a computer 117, such as desktop or notebook computer, via the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth® special interest group, IEEE 802.15.3a, also referred to as UltraWideband (UWB), or direct mode communication (e.g. a direct mode LTE, described in greater detail herein) or other PAN connection.

It will be appreciated that the above-described communication system is provided for the purpose of illustration only, and that the above-described communication system comprises one possible communication network configuration of a multitude of possible configurations for use with the mobile communication devices 201. Example embodiments may be employed in connection with any other type of network and associated devices that are effective in implementing or facilitating wireless communication. Suitable variations of the communication system will be understood to a person of skill in the art and are intended to fall within the scope of the present example embodiments.

Figure 2:
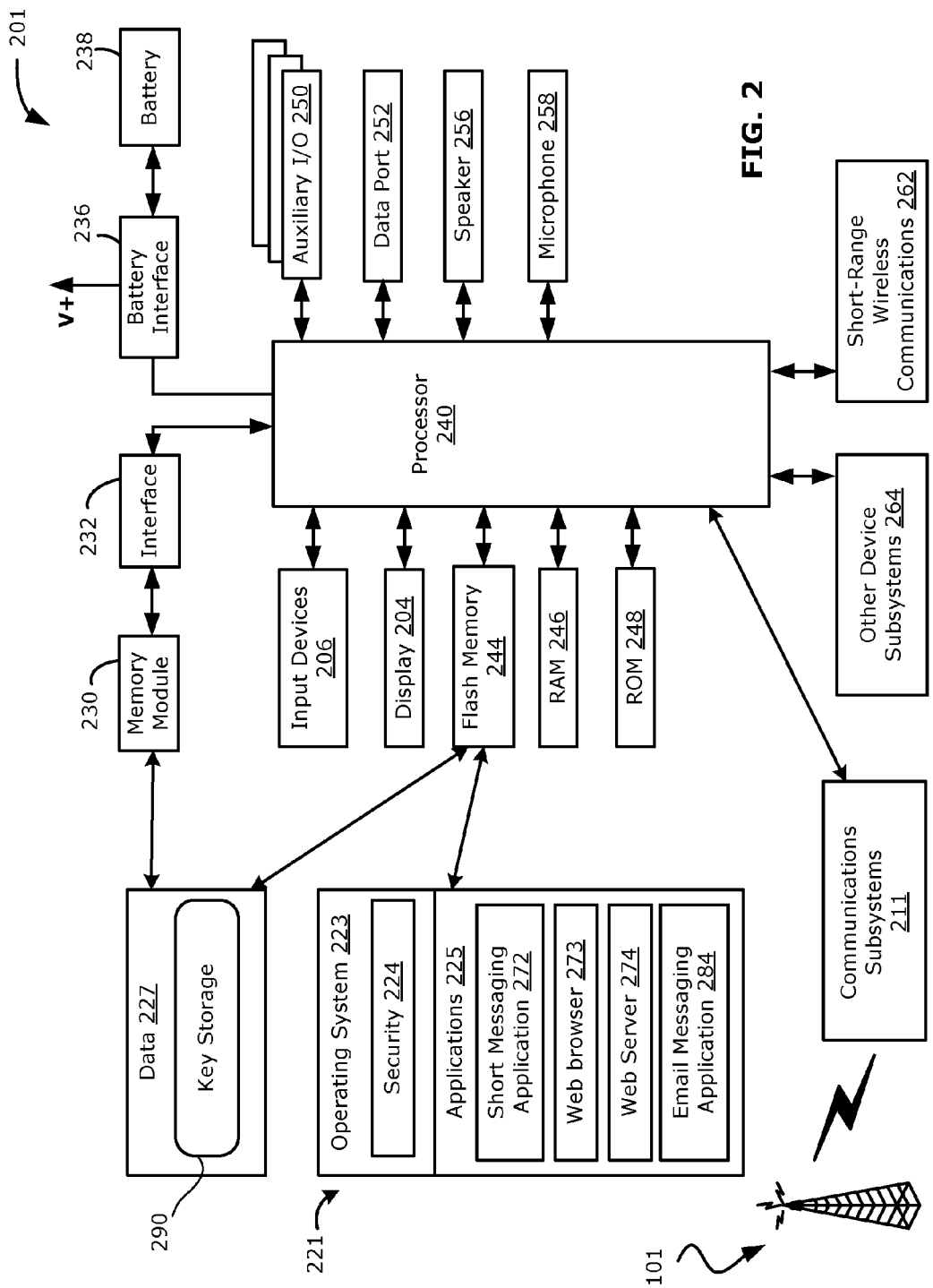
FIG. 2 illustrates a block diagram showing an example of a mobile device that can be used in the communications system of FIG. 1.

Reference is now made to FIG. 2 which illustrates a mobile device 201 in which example embodiments can be applied. The mobile device 201 is a two-way communication device having data and optionally voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The mobile device 201 may communicate with any one of a plurality of fixed transceiver base stations 108 (FIG. 1) of the wireless network 101 within its geographic coverage area. The mobile device 201 may send and receive communication signals over the wireless network 101 after the required network registration or activation procedures have been completed.

The processor 240 operates under stored program control and executes software modules 221 stored in memory such as persistent memory, for example, in the flash memory 244. As illustrated in FIG. 2, the software modules 221 comprise operating system software 223 and software applications 225, which for example, may include a short messaging application (e.g. instant messaging, SMS (Short Message Service), MMS (Multimedia Messaging Service, etc) 272, a web browser 273, a web server 274, and an email messaging application 284. In some example embodiments, the functions performed by each of the applications 272, 273, 274, and 284 may each be realized as a plurality of independent elements, and any one or more of these elements may be implemented as parts of other software applications 225. In some example embodiments, one or more applications 225 are configured to receive data, such as files, documents or other information, from a server, such as a messaging server 132 (FIG. 1), or a web or other server 142 (FIG. 1). Non-limiting examples of data received from a server may include email attachments, files transferred via file transfer protocol (FTP) or any other protocol, documents or files downloaded from a web page via a web browser, or files sent via a text or instant messaging application.

In some examples, the software applications 225 may be implemented using a number of services which define the communication protocols used to communicate between a server and an application on the communication device. Some applications may only connect to a single type of server using the same communication protocol settings and will therefore only operate using a single service, while other applications may connect to a variety of servers using different communication protocols and will require multiple services. For example, a banking application on a communication device may only require a single service defining the communication protocol for securely communicating with the bank's online banking server, while a web browser may require many different services such as services for general web page browsing, for secure web page browsing, for streaming video, for accessing corporate web email, or for accessing online public email services.

For illustration purposes, FIG. 2 shows a security module 224 as a component of the operating system 223. In some example embodiments, the security module 224 may perform security functions including the generation and management of private keys and/or public keys. The security module 224 may be used to perform the encryption/decryption or the signing/verification of data using such keys, as described in detail herein.

The software modules 221 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

In some embodiments, the auxiliary input/output (I/O) subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational tool (input device) such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 includes a removable memory card 230 (typically comprising flash memory) and a memory card interface 232. The mobile device 201 can store data 227 on the removable memory card 230, in an erasable persistent memory, which in one example embodiment is the flash memory 244, or on both a removable memory card and in an erasable persistent memory.

In various embodiments, the data 227 includes service data comprising information required by the mobile device 201 to establish and maintain communication with the wireless network 101. The data 227 may also include user application data such as email messages, address book and contact information, calendar and schedule information, word processor documents, spreadsheets, presentation slides, image files, audio and video files and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

In some example embodiments, the first communication device 201 is configured to communicate with another communication device using modes switching between a direct mode communication channel and a network-facilitated communication channel (e.g. network mode). In some example embodiments, a same communication protocol and interface may be used for operation of both modes. The direct mode communication channel may be used when the communication device 201 is in proximity to the other device. Switching to the network mode may be performed when the communication devices become out of proximity range.

In an example embodiment, the direct mode communication channel may be performed using a direct mode version of LTE. For example, LTE communication protocols and an Universal Terrestrial Radio Access (E-UTRA) interface may be used to establish a direct communication channel between the communication device 201 and another device. In an example embodiment, the network mode may be performed using LTE over a network such as wireless communication network 101. The switching control between modes may be implemented as an automated seamless function, being able to switch between modes using a same communication protocol (e.g. LTE) once a security relationship has been established, and may switch back to the direct mode when the communication devices are in proximity. For example, a same data session between the devices may maintain continuity when switching between modes.

Network components of the wireless communication network 101 may assist in switching between the communication channels or modes. In some example embodiments, the network components are used to control radio resources associated with the direct communication channel. For example, the network components may initially setup and control spectrum or channel allocation, session identifiers, etc., in relation to direct mode LTE. Once setup for the direct communication channel is facilitated by the network components, the communication devices establish the direct communication channel between each other (e.g. thereby by-passing or independent of the network components). The same network components may be used to communicate with the communication devices when switching back to LTE over the wireless communication network 101. The network components may control channel allocation, session identifiers, etc., in relation to LTE over the wireless communication network 101.

A predetermined set of applications that control basic device operations, including data and possibly voice communication applications will normally be installed on the mobile device 201 during or after manufacture. Additional applications and/or upgrades to the operating system 223 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a short message (e.g. short message service (SMS), Multimedia Messaging Service (MMS)), an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Generally, example embodiments of the mobile device 201 may utilize asymmetric keys which include related public key/private key pairs, wherein the key pair can be associated with a specified identity of a user or an electronic device. The mobile device 201 may be configured to implement signing/verification or encryption/decryption using the associated keys.

For applications, a private key may be used by a sender to sign outgoing data and/or to decrypt incoming data. A corresponding public key may be used by a recipient to decrypt received data and verify if the sender signed the data using the private key. A public key certificate includes the public key as well as the identity information of a device or of a user of a device. Such a public key certificate may be referred to as an identity key certificate, or merely a certificate.

Various examples of verification and authentication processes are described in detail in the ITU-T X.509 standard, version 11/2008, published by the International Telecommunication Union (ITU), the contents of which are herein incorporated by reference. In an example implementation, to sign data, the sender creates a hash of the data, and then signs the hash with the private key. The sender then sends the signed hash and the certificate along with the data. The recipient, after receipt of these items, can recreate the hash of the data, decrypt the encrypted hash using the public key, and check that both hashes are equal, and finally verify the certificate. A certificate in accordance with the X.509 standard may sometimes be referred to as an X.509 certificate.

In some example embodiments, the mobile device 201 may be configured or operate as a web client via the web browser 273 and/or as a server via the web server 274. The mobile device 201 may be configured to implement encryption or verification using the associated keys. For example, the mobile device 201 may store within a key storage 290 one or more public keys, one or more private keys, or a combination of public keys and private keys. The key storage 290 may include any portion of memory 244 on the device 201. In some embodiments, the memory 244 may include a secure area in which sensitive data, such as key material, is stored. In some embodiments, the secure area may itself be secured using cryptography to prevent unauthorized access.

When implementing or operating as the web server 274 for signing, the mobile device 201 can store and use a private key to sign outgoing data. A corresponding public key may be used by a recipient or client to verify that the mobile device 201 signed the data using the private key.

In other example embodiments, when receiving data such as when implementing the web browser 273, the mobile device 201 can store and use a public key to verify incoming data as being signed by an associated private key.

In some example embodiments, the security module 224 may be used to create or store a key pair. The public key certificate may be a root certificate or a self-signed certificate (root certificate and self-signed certificate are referred to interchangeably herein). In such an instance, the mobile device 201 may be referred to as a certificate authority (CA), as is understood in the art. The root certificate of a CA can be used to verify other public certificates, for example in a chain of trust implementation, as understood in the art.

An example application of a root certificate is to secure a session or Internet session between parties. For example, a second certificate may be created which is signed by the root certificate, for example for establishing TLS/SSL to implement HTTPS, as is understood in the art. Although one example application is web browsing via web server 274, other example applications include peer-to-peer communications, direct mode communication (in some example embodiments using e.g. direct mode LTE, etc), Virtual Private Networks (VPN), electronic mail, Internet faxing, instant messaging and voice-over-IP (VoIP).

In example embodiments, a thumbprint, fingerprint or certificate hash represents the binary data (e.g. hexadecimal representation) produced by computing or using a hashing algorithm on a certificate or root certificate. The thumbprint may be used to compare with a known hexadecimal representation to verify the root certificate. Although the thumbprint uniquely identifies a certificate, the thumbprint cannot be used to re-create a certificate as hashing is a one-way process.

Figure 3:
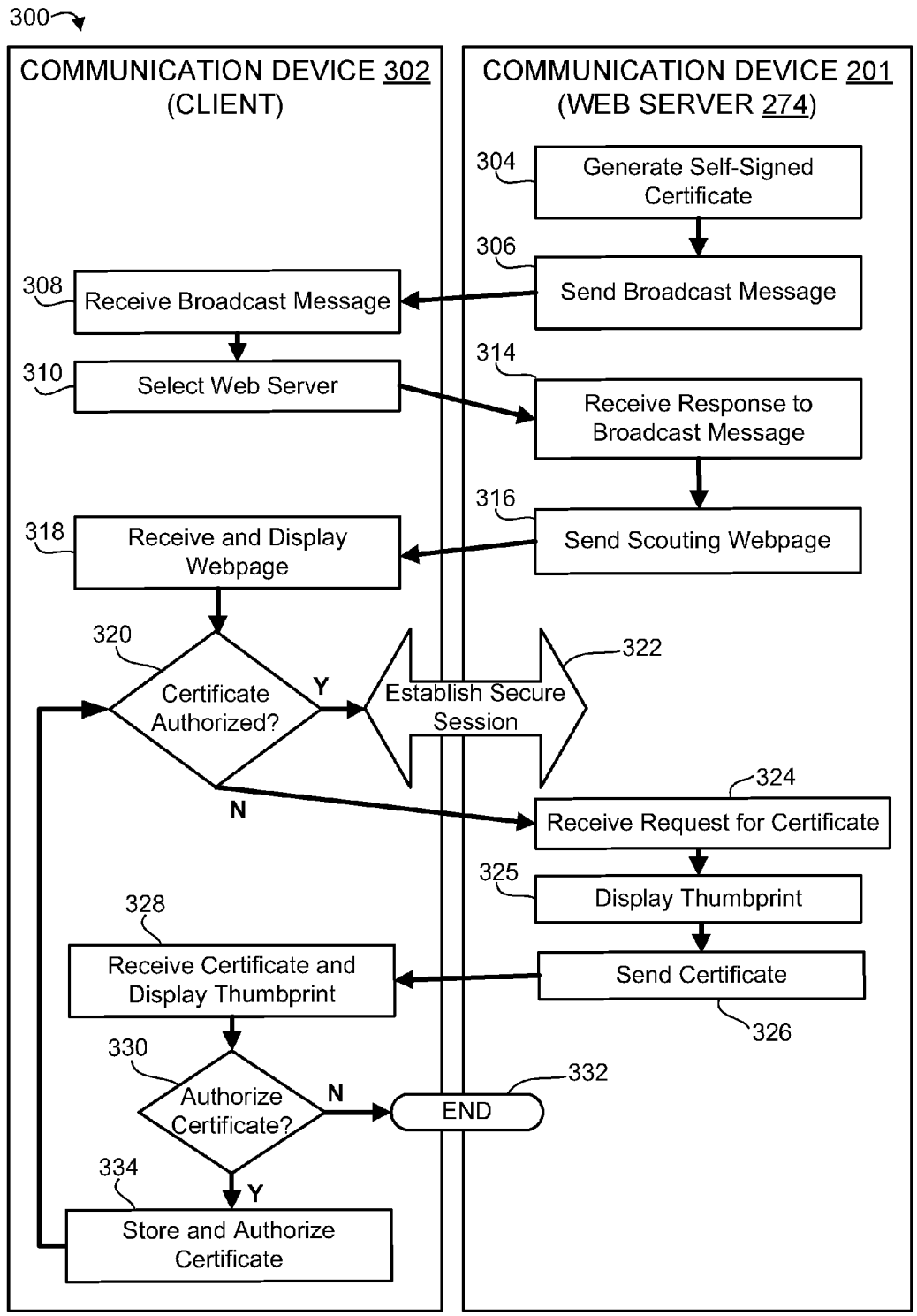
FIG. 3 shows, in flow diagram form, an example method for sending a self-signed key from a first communication device to a second communication device.

Reference is now made to FIG. 3, which shows, in flow diagram form, an example method 300 or conversation for sending a self-signed key from a first communication device 201 to a second communication device 302. In some example embodiments, the first communication device 201 is configured to operating as the web server 274 or a handheld mobile web server which can have specific software obtained from an applications developer. The web server 274 may function as a tether or bridge for facilitating establishment of a secured web session. In some example embodiments, the second communication device 302 includes a common web browser but may not have specific software from an applications developer. For example, the second communication device 302 may be a personal computer or a tablet-based computer. Other example applications other than web browsing include peer-to-peer communications, direct mode communication (using e.g. direct mode communication using LTE, etc), Virtual Private Networks (VPN), electronic mail, Internet faxing, instant messaging and voice-over-IP (VoIP).

In some example embodiments, the first communication device 201 and the second communication device 302 are in proximity and initially communicate through a local channel such as through a wireless local area network (WLAN) or WI-FI network. In some example embodiments, the first communication device 201 and the second communication device 302 are operated by a same user or local group of users in proximity. In some example embodiments, proximity includes a distance wherein a same user or local group of users can control an input device of each and/or view an output device of both the first communication device 201 and the second communication device 302. Depending on the particular circumstances, proximity can include the first communication device 201 and the second communication device 302 being within a same facility, area, or room to establish a direct or short-range communication channel such as a wireless local area network (WLAN), WI-FI network, or short-range networks such as Bluetooth® or Near Field Communications (NFC). Such mechanisms may be used to determine or trigger when the first communication device 201 and the second communication device 302 are in proximity or close range.

In some example embodiments, the first communication device 201 is configured to communicate with another device (e.g. the second communication device 302) using modes switching between a direct mode communication channel and a network-facilitated communication channel (e.g. network mode). In some example embodiments, a same communication protocol and interface may be used for operation of both modes. The direct mode communication channel may be used when the communication devices 201, 302 are in proximity to each other. The network mode may be used when the communication devices 201, 302 have established a security relationship and/or when the communication devices 201, 302 become out of range.

In some example embodiments, the method 300 may begin with the first communication device 201 and the second communication device 302 in an unsecured or untrusted communications session. For example, this may include the second communication device 302 not having authorized or injected a root certificate of the first communication device 201.

Referring still to FIG. 3, the method 300 at event 304 may begin with the first communication device 201 generating a self-signed certificate, for example a X.509 certificate. This may include creating a key pair having a public key and private key. The first communication device 201 may sign the certificate with itself in order to generate the self-signed certificate.

In some example embodiments, at event 306, the first communication device 201 may send a broadcast message to announce a presence of the communication device 201 to others within a network. In some example embodiments, the broadcast message is sent by way of a multicast User Datagram Protocol (UDP). The broadcast message may be sent using a discovery protocol such as Simple Service Discovery Protocol (SSDP).

At event 308, the second communication device 302 receives the broadcast message and therefore detects the presence of the first communication device 201. At this stage, a presentation URL may be displayed on the second communication device 302 to indicate the first communication device 201 as a device or network in the "network neighbourhood" or the resident network discovery application. At event 310, the second communication device 302 receives selection of the first communication device 201, for example through a user input. The second communication device 302 sends a response to the broadcast message to the first communication device 201 and the first communication device 201 receives the response, shown as event 314. This communication is an indication from the second communication device 302 that it desires to establish a session. At event 316, the first communication device 201 sends instructions to the second communication device 302, for example by way of a "scouting" webpage over HTTP. For example, the scouting webpage may include instructions for the second communication device 302 to check or verify whether it is permitted to connect to the first communication device 201 as a HTTPS web server. From the instructions, if a connection is permitted (e.g. a certificate is authorized as determined at event 320), the second communication device 302 can automatically redirect the web browser to the secure URL. Otherwise, the instructions can prompt a user-selectable option to click on a link to install the self-signed certificate. In example embodiments, the instructions may be sent in HTML, Java script, or other suitable languages.

An example of the instructions in HTML may be as follows:

```
<html>
<body> <img id="scriptCheck" onError="showContent( )"
onLoad="redirect( )" width="1" height="1">
<div id="certinstall" style="display:none">
 You need to install your Root Certificate to use Bridge Application
 <a href="/certificate/download">Click here</a>
 <br> Or <a id="directLink">Just continue</a> </div>
<div id="checking"> Checking security settings.... </div>
<script> counter=0;
baseHttpsLocation = "https://" + window.location.hostname;
document.getElementById("directLink").href = baseHttpsLocation;
function doCheck( ) {
document.getElementById("scriptCheck").src = baseHttpsLocation +
"/certificate/images/check.png?" + counter; counter++; }
function showContent( ) {
document.getElementById("checking").style.display = 'none';
document.getElementById("certinstall").style.display = ''; 
setTimeout("doCheck( )", 5000); }
function redirect( ) { window.location = baseHttpsLocation; } doCheck( );
</script> </body> </html>.
```

Referring now to event 318, the scouting web page is received and displayed on the second communication device 302. The instructions from the scouting web page are also interpreted by the second communication device 302. At event 320, the scouting web page instructs the second communication device 302 to determine whether a root certificate is already authorized or injected within the second communication device 302. If "yes", the second communication device 302 is automatically redirected to a secure website, and at event 322 a secure session is established. In some example embodiments, a timer or counter is used to control the detection of any existing root certificate, to wait a specified time to establish the secure session.

If there is no root certificate verified within the second communication device 302 (if "no"), the second communication device 302 requests the root certificate from the first communication device 201. As shown at event 324, the request is received by the first communication device 201. At event 326, the first communication device 201 sends a copy of the root certificate to the second communication device 302.

In some example embodiments, at event 325, in response to receiving the request at event 324, the first communication device 201 outputs to an output device a certificate hash or thumbprint of the self-signed certificate, for example displayed on the display 204 or output to the speaker 256 (FIG. 2).

In other example embodiments, still referring to event 325, the first communication device 201 may display an interface on the display 204 which includes an address of where to obtain the certificate hash. For example, the address may indicate an address of the first communication device 201, such as another web page or ftp site of the first communication device 201. In other example embodiments, the address may indicate a website or link of an exterior device to retrieve the certificate hash. The address can include a link, hyperlink, HTML address or pointer. The address may be selected to direct the first communication device 201 to retrieve the certificate hash, wherein the certificate hash is then output to the output device. This can permit a user or local group of users of the devices to compare the certificate hash to verify the self-signed certificate.

At event 328, the self-signed certificate is received by the second communication device 302. A hash of the self-signed certificate can be computed by the second communication device 302 and output to an output device such as a display or speaker. At this stage, the second communication device 302 can authorize the self-signed certificate by comparing the computed hash with the certificate hash displayed on the first communication device 201. The calculation and availability of the computed hash may depend on the particular system or application, but can typically be displayed from a configuration menu or security interface, or may be implemented from a web browser. In some example embodiments, a user verification may also be performed to manually compare the certificate hash, for example the user may have access to both the first communication device 201 and the second communication device 302.

At event 330, it is determined whether the self-signed certificate is accepted or authorized by the second communication device 302, which may include receiving a user input confirming authorization of the self-signed certificate. For example, the self-signed certificate may not be accepted if the certificate hash does not match, or any other reason. If this is the case (if "no"), then the method 300 may end as shown at event 332. The end event 332 may include sending a message to the first communication device 201 rejecting the certificate.

If the self-signed certificate is accepted or authorized by the second communication device 302 (if "yes"), the method 300 proceeds to event 334 which includes authorizing or "injecting" the self-signed certificate and storing the self-signed certificate within the second communication device 302. At this stage, a secure and trusted connection can now be established with the first communication device 201. For example, as shown in FIG. 3, the method 300 may proceed again to event 320 in an attempt to establish or re-establish a secure connection. The second communication device 302 determines whether a root certificate is authorized or injected within the second communication device 302.

The method 300 thus proceeds to event 322 to establish a secured session after successful verification of the self-signed certificate. For example, a second certificate can be generated by the first communication device 201 which is signed by the self-signed certificate, and a secure HTTPS session can be established. In some example embodiments, the second certificate can be bound to an identity of the first communication device 201, such as a network identifier (e.g., MAC address, IP address) and a common name, or to an identity of a user of the first communication device 201. In other example embodiments, other secure sessions may be established such as a peer-to-peer session or a direct mode communication session.

In some example embodiments, now that the second communication device 302 has successfully verified the self-signed certificates, a secured connection can now be secured over a same network or direct connection, or over another network. For example, a secured session can be established over a high speed link such as over WI-FI.

In another example embodiment, the various communications of the method 300 are sent using direct mode communication channel using LTE. Once the self-signed certificate has been verified, the secured session can be established by switching over to another connection such as a network mode communication channel, e.g., LTE over wireless communication network 101. This may be implemented as an automated seamless function after verifying of the self-signed certificate.

In another example embodiment, the various communications of the method 300 are sent using a short-range network such as WI-FI, Bluetooth® or Near Field Communications (NFC). Once the self-signed certificate has been verified, the first communication device 201 and the second communication device 302 establish a secure direct mode communication channel using LTE. This session may be maintained between the first communication device 201 and the second communication device 302. When the devices 201, 302 become remote and leave a proximity range or area, the devices 201, 302 may switch modes to implement LTE over wireless communication network 101. This may be performed seamlessly to maintain any existing data session.

Referring again to event 325, in some example embodiments the first communication device 201 may temporarily display a dialog box which displays the certificate hash or address. The first communication device 201 may also perform removing of the dialog box when the self-signed certificate is accepted by the second communication device 302. In other example embodiments, the certificate hash or address is displayed by the first communication device 201 in response to other events, for example at events 304, 306 or 314. In some example embodiments, the certificate hash or address is continually displayed, and may be removed upon acceptance from the second communication device 201.

Figure 4:
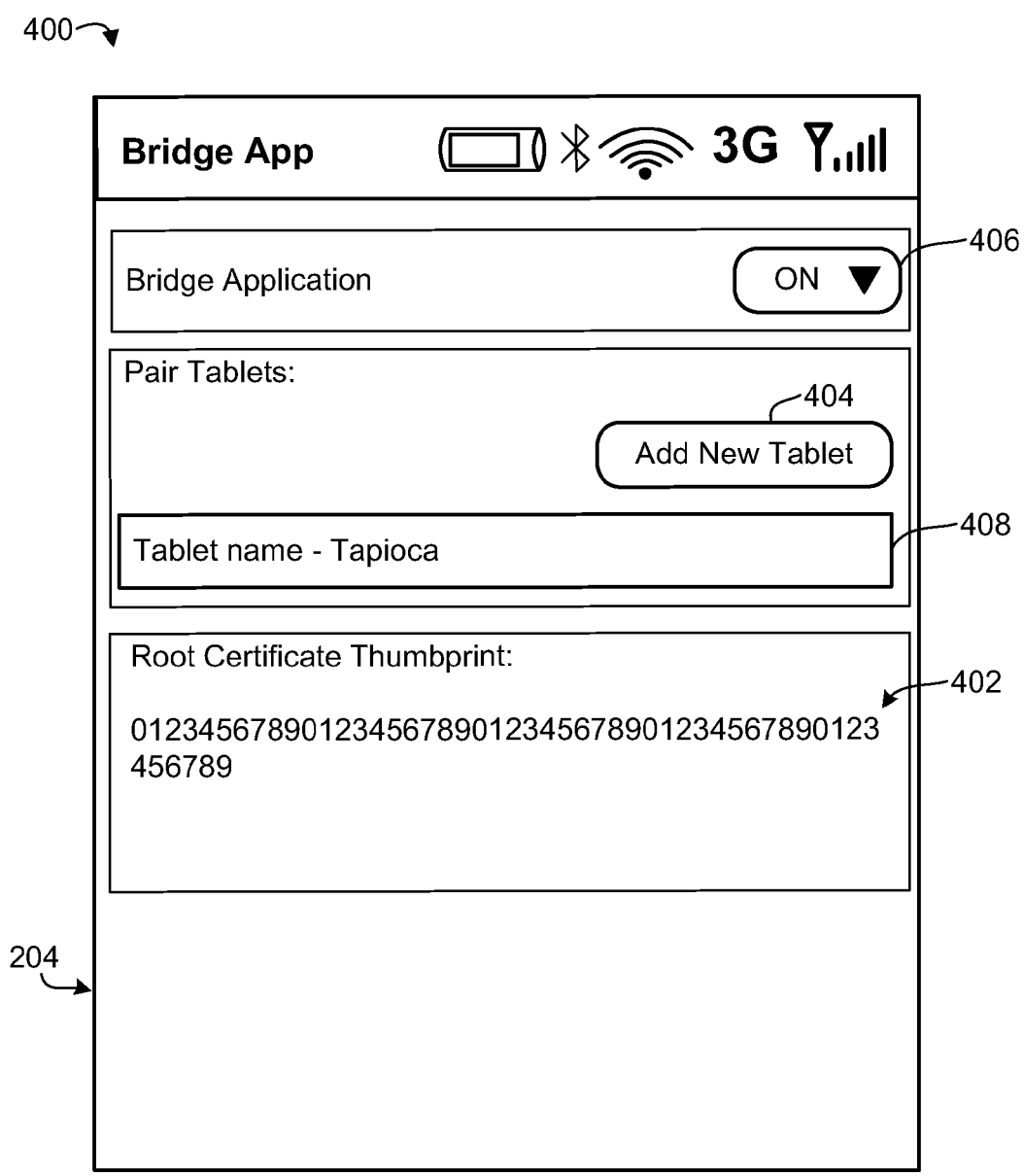
FIG. 4 shows an example interface screen as displayed on the communication device of FIG. 2, in accordance with an example embodiment.

Reference is now made to FIG. 4, which shows an example interface screen 400 as displayed on the first communication device 201, in order to implement at least some embodiments of the method 300 of FIG. 3. As shown in the interface screen 400, a certificate hash field 402 can display the certificate hash in alphanumeric form (e.g. visible alphanumerals). The options interface screen 400 may include an user-selectable option 404 to select a second communication device 302 (e.g. a tablet) which has accepted the discovery process. The selection of the option 404 can result in starting of the discovery process (e.g. event 306) of the method 300. In some example embodiments, other options may include options for manually sending of the self-signed certificate (e.g. event 326). Other options may include options for manually triggering the generation of the root certificate (e.g. event 304). As shown in FIG. 4, activation option 406 can be used to toggle on or off the entire process or application (e.g. method 300). Field 408 lists all of the second communication devices 302 wherein a trust relationship has been established. In the example shown, one device (e.g. name "Tapioca") is listed. In some example embodiments, selection of the field 408 may result in display of further details of the second communication device 302 ("Tapioca"), and/or additional certificates or further identifiers (not shown).

The options interface screen 400 may alternatively display an address or link of where to retrieve the certificate hash.

Referring again to event 325 in FIG. 3, in some example embodiments the first communication device 201 may display a popup window for displaying of the certificate hash or the address, or for displaying of the options screen 400.

Figure 5:
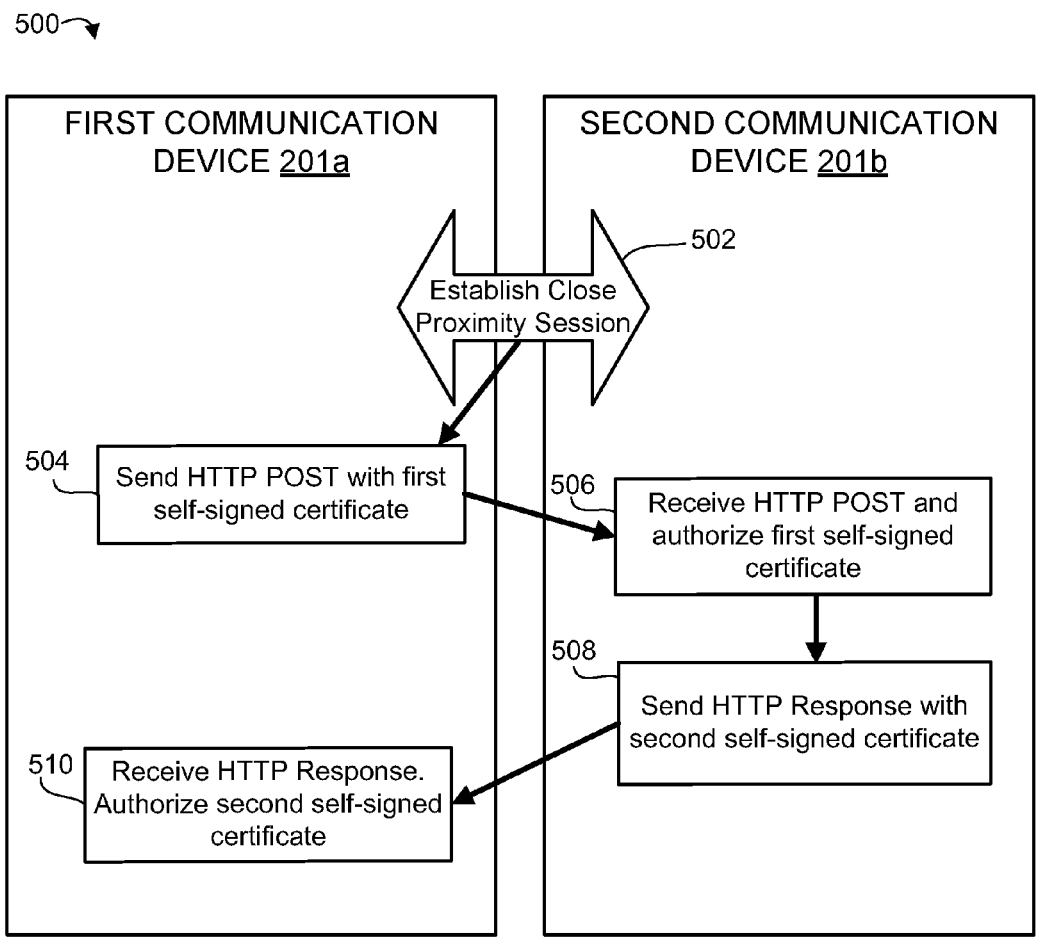
FIG. 5 shows, in flow diagram form, another example method for mutual exchanging of self-signed certificates between a first communication device and a second communication device.

Reference is now made to FIG. 5, which shows, in flow diagram form, an example method 500 or conversation for mutual exchanging of self-signed certificates between a first communication device 201a and a second communication device 201b, in accordance with an example embodiment.

Some example embodiments relate to using a low speed channel to secure a high speed channel. For example, Bluetooth® is an example of a low speed channel wherein requesting large amounts of data can be slow. Near Field Communications (NFC) is an example of a low speed channel wherein requesting large amounts of data can be slow. Some example embodiments may use the secured channel to subsequently facilitate a HTTPS session over a high speed connection such as WIFI. Other example applications other than HTTPS may also take advantage of the secure relationship to be established. Some further example embodiments relate to using a direct communication channel to secure a network communication channel. For example, a direct mode LTE is an example of a direct communication channel while LTE over wireless communication network 101 is an example of a network communication channel.

In some example embodiments, the first communication device 201a and the second communication device 201b may each have specific software obtained from an applications developer. In some example embodiments, one of the communication devices 201a, 201b is configured to operating as the web server 274 or a handheld mobile web server. The other of the communication devices 201a, 201b is configured to operate using the web browser 273. For example, the web server 274 may be implemented on a handheld mobile communication device while the web browser 273 may be implemented on a tablet-based mobile communication device.

The method 500 may begin with the first communication device 201a generating a first self-signed certificate. Similarly, the second mobile communication device 201b may also perform generating a second self-signed certificate. For example, the self-signed certificates may be X.509 certificates.

The method 500 at event 502 establishes a proximity session such as a Bluetooth® connection. For example, a secure session may be generated in Bluetooth® which is independent of the security of any HTTPS session. At event 504, the first communication device 201a sends the first self-signed certificate to the second communication device 201b. In some example embodiments, an HTTP POST with the contents of the first self-signed certificate is sent to the second communication device 201b.

At event 506, the second communication device 201b receives the first self-signed certificate within the HTTP POST. The second communication device 201b authorizes and stores the first self-signed certificate within a key storage 290 (FIG. 2). At event 508, the second communication device 201b creates a HTTP Response which includes the second self-signed certificate. At event 510, the first communication device 201a receives the second self-signed certificate within the HTTP Response. The first communication device 201a authorizes and stores the second self-signed certificate within a key storage 290 (FIG. 2).

Accordingly, the second communication device 201b can connect to the first communication device 201 as web server, and vice versa. Having exchanged the self-signed certificates, a secured connection can now be secured over a same short-range or direct connection. In other example embodiments, a secured connection can be secured over another network. For example, a secured session can be established over a high speed link such as over WI-FI rather than the Bluetooth® connection. It would be appreciated that, by having a mutual exchange of self-signed certificates, a two-way trust relationship is created between the communication devices 201a, 201b.

In some example embodiments, the first communication device 201a may send to the second communication device 201b a certificate hash of the first self-signed certificate or an address of where to obtain the certificate hash. The first communication device 201a may display the certificate hash on an output device of the first communication device 201a. The second communication device 201b may compare the certificate hash to confirm or authorize the first self-signed certificate. Similarly, the second communication device 201b may send to the first communication device 201a a certificate hash of the second self-signed certificate or an address of where to obtain the certificate hash. The second communication device 201b may display the certificate hash on an output device of the second communication device 201b. The first communication device 201a may compare the certificate hash to confirm or authorize the second self-signed certificate.

In some example embodiments, at least some of the communications may be performed over a Bluetooth® or over Near Field Communications (NFC). In some example embodiments, some or all of the events of the method 300 of FIG. 3 may be implemented within the method 500 of FIG. 5.

In some other example embodiments, at event 502 a direct mode LTE session is established. After exchanging the self-signed certificates, the second communication device 201*b* can connect to the first communication device 201 by switching over to a network mode communication channel at a wider range, such as LTE over wireless communication network 101.

In another example embodiment, at event 502 a short-range network such as Bluetooth® or Near Field Communications (NFC) is established. Once both of the self-signed certificates have been verified, the first communication device 201*a* and the second communication device 201*b* establish a secure direct mode communication channel using LTE. This session may be maintained between the first communication device 201*a* and the second communication device 201*b*. When the devices 201*a*, 201*b* become remote and leave a proximity range or area, the devices 201, 201*b* may switch modes to implement LTE over wireless communication network 101. This may be performed seamlessly to maintain any existing data session.

Some example embodiments may be applied to a chain of trust implementation. In a chain of trust, certificates are often trusted based on the validity of "higher ranking" certificates. Certificates are issued and signed by certificates that reside higher in the certificate hierarchy, so the validity and trustworthiness of a given certificate is determined by the corresponding validity of the certificate associated with the certificate authority that signed the given certificate. Thus, there is often a root CA, which provides the ultimate in attestation authority in that chain of trust implementation using the root certificate. Accordingly, the trust anchor for the digital certificate is the root certificate authority. The root certificate from the mobile device 201 as CA may be communicated to a client in accordance with at least some of the described example embodiments.

Some example embodiments may be applied to a web of trust environment wherein there is no central CA per se, and accordingly identity certificates for some or all of the clients may be self-signed. In this case, the additional signatures from some or all of the other clients are evaluated to determine whether a certificate should be accepted as correct. Each generated certificate may be communicated between each of the devices. For example, at least the certificate from the mobile device 201 may be communicated to at least another client in the web of trust in accordance with the described example embodiments. At least some of the remaining clients may similarly implement at least some of the described example embodiments.

While some of the present embodiments are described in terms of methods, a person of ordinary skill in the art will understand that present embodiments are also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

While some of the above examples have been described as occurring in a particular order, it will be appreciated to persons skilled in the art that some of the messages or steps or processes may be performed in a different order provided that the result of the changed order of any given step will not prevent or impair the occurrence of subsequent steps. Furthermore, some of the messages or steps described above may be removed or combined in other embodiments, and some of the messages or steps described above may be separated into a number of sub-messages or sub-steps in other embodiments. Even further, some or all of the steps of the conversations may be repeated, as necessary. Elements described as methods or steps similarly apply to systems or subcomponents, and vice-versa. Reference to such words as "sending" or "receiving" could be interchanged depending on the perspective of the particular device.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

What is claimed is:

1. A method of sending a self-signed certificate from a communication device, the self-signed certificate being signed by said communication device, the method comprising:

receiving a communication in relation to establishing a session from a second communication device in short-range communication proximity to said communication device;

sending a message to said second communication device which includes the self-signed certificate to said second communication device and which causes said second communication device to determine whether the self-signed certificate is already authorized in said second communication device;

when said communication device is authorized in said second communication device, establishing the session using the self-signed certificate;

when said communication device is not authorized in said second communication device, and as a consequence to said receiving:

outputting, on an output device of said communication device, a certificate hash of the self-signed certificate, and establishing the session using the self-signed certificate, wherein said output device comprises a display screen of said communication device, or a speaker of said communication device, or a computer equipment of said communication device used to convert electronically generated information into human-detectable form, wherein said communication device and said second communication device each are a mobile communication device.

2. The method as claimed in claim 1, further comprising generating the self-signed certificate at said communication device.

3. The method as claimed in claim 1, further comprising said communication device sending a broadcast message to announce a presence of said communication device.

4. The method as claimed in claim 1, further comprising receiving a second self-signed certificate from said second communication device, wherein said second self-signed certificate is signed by said second communication device.

5. The method as claimed in claim 1, further comprising said communication device outputting an interface screen for displaying of the certificate hash.

6. The method as claimed in claim 1, wherein said sending is performed over a short-range communication channel.

7. The method as claimed in claim 1, wherein said receiving is received via a wireless local area network (WLAN) network.

8. A communication device, wherein said communication device is a mobile communication device, comprising:

a processor;

memory for storing a self-signed certificate, the self-signed certificate being signed by the communication device;

an output device, wherein said output device comprises a display screen of said communication device, or a speaker of said communication device, or a computer equipment of said communication device used to convert electronically generated information into human-detectable form; and a communication subsystem configured to send and receive communications with a second communication device, wherein said second communication device is a mobile communication device and is in short-range communication proximity to said communication device, the processor being configured for:

receiving a communication in relation to establishing a session from said second communication device, sending a message to said second communication device which includes the self-signed certificate to said second communication device and which causes said second communication device to determine whether the self-signed certificate is already authorized in said second communication device, when said communication device is authorized in said second communication device, establishing the session using the self-signed certificate, when said communication device is not authorized in said second communication device, and as a consequence to said receiving:

outputting, on the output device, a certificate hash of the self-signed certificate, and establishing the session using the self-signed certificate.

9. The communication device as claimed in claim 8, wherein the processor is further configured for generating the self-signed certificate.

10. The communication device as claimed in claim 8, wherein the processor is further configured for sending a broadcast message to announce a presence of said communication device.

11. The communication device as claimed in claim 8, wherein the processor is further configured for receiving a second self-signed certificate from said second communication device, wherein said second self-signed certificate is signed by said second communication device.

12. The communication device as claimed in claim 8, wherein the processor is further configured for displaying an interface screen for outputting of the certificate hash.

13. The communication device as claimed in claim 8, wherein said sending is performed over a short-range communication channel.

14. A non-transitory computer readable medium having instructions stored thereon executable by a processor for sending a self-signed root certificate from a communication device, the self-signed certificate being signed by the communication device, the instructions comprising instructions for:

receiving a communication in relation to establishing a session from a second communication device in short-range communication proximity to said communication device;

sending a message to said second communication device which includes the self-signed certificate to said second communication device and which causes said second communication device to determine whether the self-signed certificate is already authorized in said second communication device;

when said communication device is authorized in said second communication device, establishing the session using the self-signed certificate;

when said communication device is not authorized in said second communication device, and as a consequence to said receiving:

outputting, on an output device of said communication device, a certificate hash of the self-signed certificate, and establishing the session using the self-signed certificate, wherein said output device comprises a display screen of said communication device, or a speaker of said communication device, or a computer equipment of said communication device used to convert electronically generated information into human-detectable form, wherein said communication device and said second communication device each are a mobile communication device.

15. A method of sending a self-signed certificate from a communication device, the self-signed certificate being signed by said communication device, the method comprising:
- receiving a communication in relation to establishing a session from a second communication device in short-range communication proximity to said communication device;
- sending a message to said second communication device which includes the self-signed certificate to said second communication device and which causes said second communication device to determine whether the self-signed certificate is already authorized in said second communication device;
- when said communication device is authorized in said second communication device, establishing the session using the self-signed certificate;
- when said communication device is not authorized in said second communication device:
- outputting on an output device of said communication device, as a consequence to said receiving, an address of where to obtain a certificate hash of the self-signed certificate, and
- establishing the session using the self-signed certificate,
- wherein said output device comprises a display screen of said communication device, or a speaker of said communication device, or a computer equipment of said communication device used to convert electronically generated information into human-detectable form,
- wherein said communication device and said second communication device each are a mobile communication device.

16. The method as claimed in claim 15, wherein the address indicates an address of said communication device.

\* \* \* \* \*